UNITED STATES PATENT OFFICE.

HEINRICH THRON, OF FRANKFORT-ON-THE-MAIN, EDUARD SPRÖNGERTS, OF BIEBRICH, AND CARL FREUND, OF FRANKFORT-ON-THE-MAIN, GERMANY, ASSIGNORS TO VEREINIGTE CHININFABRIKEN ZIMMER & CO., G. M. B. H., OF FRANKFORT-ON-THE-MAIN, GERMANY, A FIRM OF GERMANY.

MANUFACTURE OF CARBAMATES OF TERTIARY ALCOHOLS.

1,016,977. Specification of Letters Patent. Patented Feb. 13, 1912.

No Drawing. Application filed July 10, 1911. Serial No. 637,781.

*To all whom it may concern:*

Be it known that we, HEINRICH THRON, residing at Frankfort-on-the-Main, EDUARD SPRÖNGERTS, residing at Biebrich-on-the-Rhine, and CARL FREUND, residing at Frankfort-on-the-Main, Germany, subjects of the German Emperor, have invented certain new and useful Improvements in the Manufacture of Carbamates of Tertiary Alcohols, of which the following is a specification.

The manufacture of esters of tertiary alcohols, when compared with that of the esters of primary and secondary alcohols, presents various difficulties which till now have made it impossible to prepare the carbamates of the tertiary alcohols, i. e., of their urethanes. We have now succeeded in obtaining these carbamates (urethanes) by causing urea chlorid to react on tertiary alcohols in the presence of bodies binding hydrochloric acid. For this purpose the tertiary alcohols may be converted into their metallic compounds, the metal binding the hydrochloric acid in the further course of the reaction; or the bodies which bind the hydrochloric acid, namely organic, or inorganic, basic substances, may be added directly to the reaction mixture.

The following are examples of how this invention may be performed, but we do not limit ourselves to these. The parts are by weight.

*Example I. Manufacture of the carbamate of tertiary amyl alcohol.*—88 parts of tertiary amyl alcohol (amylen-hydrate) mixed with 600 parts of benzene are boiled with 23 parts of sodium, until almost the whole is dissolved. The liquor is decanted, well cooled and slowly mixed, while being stirred, with 79.5 parts of urea chlorid which has been diluted with 400 parts of benzene. After allowing the mixture to stand for some time, the liquor is drawn off, by suction, from the sodium chlorid and the benzene is distilled off. In mixing the oily residue with benzene, crystallization takes place. The liquor is drawn off by suction and the crystals washed with benzene and recrystallized from dilute alcohol.

The carbamate of tertiary amyl alcohol ($NH_2CO_2 \cdot C_5H_{11}$) consists of fine colorless needles having a feeble odor and taste of camphor and melting at from 83° to 86° centigrade. It is readily soluble in most organic solvents, but difficultly soluble in petroleum benzene and water. It has, as against the amyl ester of allophanic acid, which is also a solid, odorless body, the advantage of having a much superior hypnotic action. Whether this is a consequence of the easier decomposibility, or a peculiarity of the urethanes, is uncertain.

*Example II. Manufacture of the carbamate of tertiary amyl alcohol.*—To the Grignard's reaction products obtained, in the usual manner, from 24.3 parts of magnesium, 200 parts of ether and 64.5 parts of ethyl chlorid, 88 parts of tertiary amyl alcohol are slowly added. When the evolution of ethane is over, 79.5 parts of carbamic acid chlorid which have been diluted with 200 parts of benzene are slowly added while stirring and well cooling. After standing for some time, the mixture is poured into ice, the ethereal solution is separated from the water, washed with water in which sodium carbonate is dissolved and dried by means of calcium chlorid. The ether and benzene are then distilled off and the residue is recrystallized from benzene.

*Example III. Manufacture of di-ethyl-methyl-carbinol carbamate.*—The Grignard compound is manufactured, in the usual way, from 24.3 parts of magnesium, 250 parts of anhydrous ether and 64.5 parts of ethylchlorid. To this are added 72 parts (one molecular proportion) of ethyl-methyl-ketone and, when the reaction is completed, 79.5 parts of urea chlorid (one molecular proportion) are run into the mixture while cooling. The magnesium is extracted from the reaction product by means of dilute hydrochloric acid, the ethereal solution is dried by means of calcium chlorid, the ether expelled and the residue distilled *in vacuo*. In this way the carbamate of di-ethyl-methyl-carbinol is obtained in colorless needles having an odor like that of camphor.

*Example IV. Manufacture of the carbamate of tertiary amyl-alcohol.*—88 parts of tertiary amyl alcohol are mixed with 121 parts of di-methyl-anilin and 300 parts of benzene. To this mixture is then added, slowly and while cooling, a solution of 79.5 parts of urea chlorid in 200 parts of benzene. After being allowed to stand for several hours the mixture is shaken with diluted hydrochloric acid, and the benzene solution is then dried by means of calcium chlorid and concentrated. On cooling the amyl ester of carbamic acid crystallizes out.

*Example V. Manufacture of carbamate of tertiary amyl alcohol.*—88 parts of tertiary amyl alcohol are mixed with 53 parts of anhydrous sodium carbonate and 300 parts of benzene. This mixture is, while stirred and cooled, mixed with a solution of 79.5 parts of urea chlorid in 200 parts of benzene. The reaction product is washed with water, the benzene solution dried by means of calcium chlorid, and the greater part of the benzene distilled off on the water bath. On cooling the amyl ester of carbamic acid crystallizes out.

We claim:

1. The herein described process of the production of carbamac acid esters of tertiary alcohols which consists in causing ureachlorid to react on tertiary alcohols in the presence of a substance which is able to bind hydrochloric acid.

2. Carbamic acid esters of tertiary alcohols obtained by causing ureachlorid to react on a tertiary alcohol in the presence of a substance able to bind hydrochloric acid.

3. Carbamic acid ester of tertiary amyl alcohol obtained by causing ureachlorid to react on tertiary amyl alcohol in the presence of a substance able to bind hydrochloric acid.

In testimony whereof we have signed our names to this specification in the presence of two subscribing witnesses.

HEINRICH THRON.
EDUARD SPRÖNGERTS.
CARL FREUND.

Witnesses:
 JEAN GRUND,
 CARL GRUND.